J. R. LOUDEN.
PISTON RING GAGE.
APPLICATION FILED JULY 17, 1919.
1,381,075.
Patented June 7, 1921.
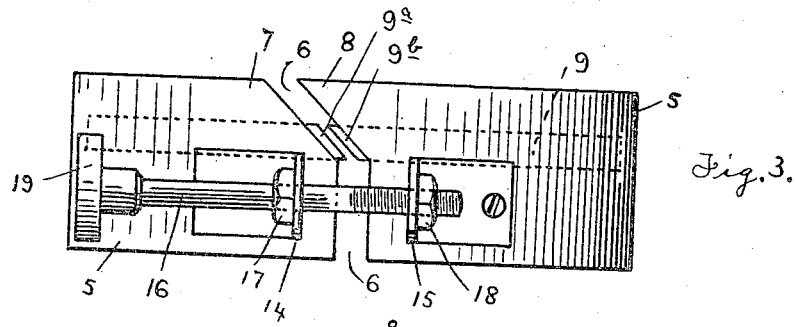
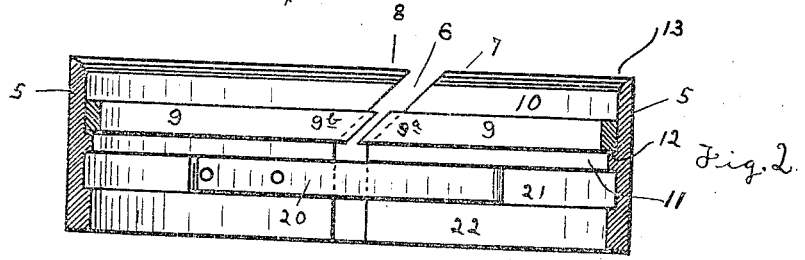
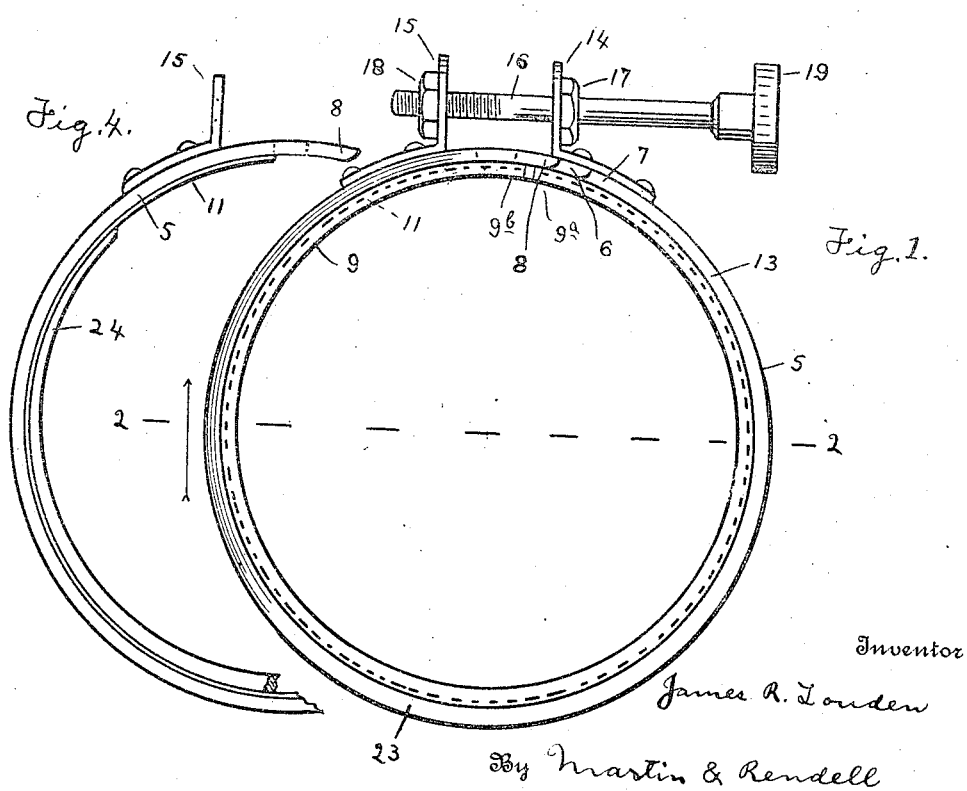

UNITED STATES PATENT OFFICE.

JAMES R. LOUDEN, OF UTICA, NEW YORK.

PISTON-RING GAGE.

1,381,075.  Specification of Letters Patent.  Patented June 7, 1921.

Application filed July 17, 1919. Serial No. 311,569.

*To all whom it may concern:*

Be it known that I, JAMES R. LOUDEN, a citizen of the United States, and a resident of Utica, in the county of Oneida and State of New York, have invented certain new and useful Improvements in Piston-Ring Gages; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to piston ring gages.

The piston rings of explosive engines are supposed to be so adjusted that when the engine is working at normal temperatures the piston rings will be gas-tight without being grinding-tight upon the cylinder. This result is supposed to be effected by having the adjacent ends of the split piston ring a given number of thousandths of an inch apart when the rings are cold and set into the cylinder. The extent of clearance between the ends should also differ according to whether the ring is the upper or lower ring of the piston and so subject to different expansion due to the different degree of heat to which it is subjected when the engine is operating. Heretofore it has been very difficult to obtain the required nicety of adjustment when the car is first assembled at the factory and especially when being repaired at a garage or by the owner himself. The main reason for this difficulty of adjustment is that the piston rings have to be adjusted to the size of the individual cylinder in which they are to be used and furthermore to the portion of the cylinder in which they will operate. When the engine is new the adjustment may be made roughly by placing the piston rings in the lower end of the cylinder. Adjustment in this way, however, is apt to be inaccurate for the reason of there being no positive means for holding the adjacent ends of the split piston ring in alinement. When the engine has been used and its cylinders have become worn the piston rings must be adjusted for the used portion instead of the lower end of the cylinders. Heretofore this has been done by placing the piston ring the required distance up in the cylinder. This tends to inaccuracy for the reason that there is no positive means for holding the ends of the cylinder ring in alinement and the testing has to be done in such an awkward position, namely, a considerable distance up inside the cylinder, that the workman is not apt to get the clearance between the piston ring ends accurately measured. The difficulty is further increased by the fact that the ordinary split piston ring has its ends shaped with opposite bevels so that the true clearance cannot be seen from below and the use of a thickness gage is further handicapped.

It is the purpose of my invention to provide a gage for piston rings which will over-come the difficulties above mentioned and which is simple and durable in construction and efficient, accurate and very convenient in use.

A further purpose of my invention is to provide an article of the class described which may be accurately set to the exact diameter of the cylinder to which the piston rings are to be fitted and which will provide means for positively holding the piston ring ends in alinement and which further will afford convenient opportunity for accurately determining the distance between the ends of the piston ring; and still further to provide a gage of such construction and operation that the piston ring may be readily placed therein or removed therefrom thus allowing the testing to be rapidly made and also allowing the piston ring to be removed and re-placed as often as required for trimming off the ends of the ring in order to get the desired clearance.

Another object of my invention is to provide a gage of the class described of such construction and operation that it may be adjusted within its range of sizes without distorting the circular form of the gage and further to have the gage of such adjustability that one size of gage can be used for a considerable range of sizes of cylinders.

Figure 1 is a plan view of a piston ring gage embodying my invention.

Fig. 2 is a cross-sectional view on line 2—2 of Fig. 1.

Fig. 3 is a side view of the gage shown as seen from the side having the adjusting screw.

Fig. 4 is a plan view of about half of a piston ring gage embodying a modified form of my invention.

Referring to the drawings in a more particular description it will be seen that the piston ring gage consists of a ring 5 of resilient metal or other suitable material cut entirely through at one side forming a slot 6 with the ends 7 and 8 of the ring relatively closely adjacent to each other. The ring is so formed and constructed of material that the gage may be expanded and contracted within the relatively small range of sizes desired and yet maintain the circularity of the gage.

It will be understood that the piston ring 9 that is to be tested will be placed into the gage ring 5 from the top as the gage is illustrated in the drawings and will fit closely and accurately against the inner measuring surface 10. Immediately below said measuring surface 10 there is provided means for holding the piston ring even with the gage, that is the same distance down in the gage, and also for holding the ends 9a and 9b of the piston ring accurately in alinement. The preferred form of said means comprises an inwardly extending rib 11 upon the ring immediately below the measuring surface 10 providing an upwardly facing shoulder 12 against which will lie the lower side of the piston ring 9.

The upper edge 13 of the ring 5 will preferably be rounded off so as to slope inwardly as it goes down in order to facilitate the placing of the piston ring within the gage.

Slightly back from the slot 6 the ring 5 will have its opposite ends 7 and 8 provided with oppositely disposed outwardly extending brackets 14 and 15 respectively. Through apertures provided in these brackets extends the shank of an adjusting screw 16 which has a fixed collar 17 outside the bracket 14 while its screw-threaded portion engages a nut 18 on the outer side of the other bracket 15. The screw 16 will preferably be provided with a head 19 knurled upon its edge and of sufficient diameter so that the gage may be readily and accurately set to the desired size. It will be obvious that the screw-threaded adjustment of the ends 7 and 8 of the ring through the projecting brackets 14 and 15 may be obtained in various ways and that the details thereof just above described are simply illustrative of the preferred and convenient form thereof.

Preferably the slot 6 will be shaped substantially as shown; that is, with its upper portion slanting down as far as the rib 11 and then extending straight through the ring. The advantage of this arrangement is that it allows the operator to place the piston ring with its beveled ends in the piston gage so that said beveled ends will project over the slot 6 and parallel therewith thus facilitating the use of thickness gages or other means of accurately measuring the distance between the ends of the piston ring.

In order that the gage may maintain its ends in alinement and so hold a piston ring therein in alinement, there is provided preferably positively operating means consisting of a tongue 20 rigidly secured to one end as 8 of the ring and projecting across the slot 6 and into a groove 21 on the other end 7. Preferably this tongue and groove will be provided upon the inner surface of the ring 5. The lower edge of rib 11 will then form one side of groove 21 and the lower side of said groove will be provided with the upper edge of the rib 22 near the lower edge of the ring 5. It will be understood that the tongue 20 is shaped to conform to the circle of the ring so as not to interfere with the circularity of the gage ring at the different sizes to which it may be adjusted.

The ring 5 is of such form and construction that it may be adjusted to various sizes within its limits and still maintain its circularity. In other words the gage is to be contracted to various diameters but at any given size to which it is adjusted the gage will measure the same diameter no matter in which direction the measurement is taken.

In Figs. 1 to 3 of the drawings this end is attained by having the inner circle or faces of the ring eccentric relative to the outer surface of the ring thus leaving one side of the ring thick and with opposite sides tapering down thinner as they approach the side opposite to the thick side. The thick side as 23 will be diametrically opposite to the slot 6 and the ring will gradually taper to less thickness as it approaches the said slot 6. In this way the bending or contracting action due to tightening up the adjusting screw 16 will be greater upon the thin portions and gradually decreases as the contraction is extended about the circle thus resulting in a perfect circle being maintained at all positions to which the gage is adjusted.

The modification shown in Fig. 4 consists in having the main ring 5 of the same thickness at all points about the ring instead of tapering to be gradually thinner toward the slot of the ring. In this modified form the circularity of the gage at different sizes to which it may be set is maintained by inserting within the ring 5 a separate spring 24 forming nearly a complete circle and thickest away from the slot 6 of the gage and gradually decreasing in thickness as it approaches the slot. This spring 24 thus has greater stiffness away from the slot and becomes more resilient as it approaches the slot and so allows the ring 5 to be drawn together under the tension of the adjusting screw and yet maintain the circularity of the gage at all positions to which it may be set. The spring 24 may be placed in the ring 5 to bear against the inner surface of the rib 22. It will be not wider than said rib so as not to interfere with the gage being placed upon the workbench and so as not to have said spring interfere with or bind against the alining tongue 20. In order to more clearly show the formation of the spring 24 the piston ring is omitted from the drawing in Fig. 4.

In operation the user will ascertain accurately as by calipers or micrometer the diameter of the cylinder in which the piston ring is to be used and then will by similar means adjust the diameter of the piston ring gage to the same size by proper rotation of the screw 16. The piston ring will then be placed in the gage so as to rest upon the shoulder 12. Preferably as already suggested the piston ring will be so placed in the gage that its beveled ends will project from either side out across the slot 6. The user will then successively measure and trim down the ends of the piston ring until there is the desired clearance between them. During this operation the piston ring may be removed as often as desired and be placed again in the gage without the gage losing the adjustment that has been made thereof.

What I claim as new and desire to secure by Letters Patent is:

1. A piston ring gage comprising a split ring adapted to be contracted circumferentially and maintain its circularity and adjusting means connected to the ends of the ring to so contract the ring and positively hold it at desired size, the interior face of said ring being adapted to receive a split piston ring and temporarily contract the same to the diameter of the measuring inner surface of the gage whereby the space between the ends of the piston ring may be accurately measured.

2. A piston ring gage comprising a split ring adapted to be contracted circumferentially and maintain its circularity and screw-threaded adjusting means connected to the ends of the ring to so contract the ring and positively hold it at desired size, the interior face of said ring being adapted to receive the split piston ring and temporarily contract the same to the diameter of the measuring inner surface of the gage whereby the space between the ends of the piston ring may be accurately measured.

3. A piston ring gage comprising a split ring adapted to be contracted circumferentially and maintain its circularity, adjusting means connected to the ends of the ring to so contract the ring and hold it at desired size, the interior face of said ring being adapted to receive a split piston ring and temporarily contract the same to the diameter of the measuring inner surface of the gage and means adapted to keep the opposite ends of the piston ring in alinement.

4. A piston ring gage comprising a split ring adapted to be contracted circumferentially and maintain its circularity, adjusting means connected to the ends of the ring to so contract the ring and hold it at desired size, the interior face of said ring being adapted to receive a split piston ring and temporarily contract the same to the diameter of the measuring inner surface of the gage and an inwardly extending shoulder part way down in the gage ring against which the piston ring may be set to keep the opposite ends of the piston ring in alinement.

5. A piston ring gage comprising a split ring adapted to be contracted circumferentially and maintain its circularity, adjusting means connected to the ends of the ring to so contract the ring and hold it at desired size, the interior face of said ring being adapted to receive a split piston ring and temporarily contract the same to the diameter of the measuring inner surface of the gage ring and means to keep the opposite ends of the gage ring in alinement in all positions.

6. A piston ring gage comprising a split ring adapted to be contracted circumferentially and maintain its circularity, adjusting means connected to the ends of the ring to so contract the ring and hold it at desired size, the interior face of said ring being adapted to receive its piston ring and temporarily contract the same to the diameter of the measuring inner surface of the gage ring and a coöperating mortise and tenon on opposite ends of the gage ring adapted to keep said gage ring ends in alinement at all positions.

7. A piston ring gage comprising a split ring adapted to be contracted circumferentially and maintain its circularity, adjusting means connected to the ends of the ring to so contract the ring and hold it at desired size, the interior face of said ring being adapted to receive its piston ring and temporarily contract the same to the diameter of the measuring inner surface of the gage ring, means to keep the opposite ends of the gage ring in alinement at its different positions and means adapted to keep the opposite ends of the piston ring in accurate alinement.

In witness whereof I have affixed my signature, this 15th day of July, 1919.

JAMES R. LOUDEN.